(12) United States Patent
Budmiger

(10) Patent No.: US 6,937,943 B2
(45) Date of Patent: Aug. 30, 2005

(54) DEVICE AND METHOD FOR SYSTEM AND PROCESS SUPERVISION IN A MAGNETO-INDUCTIVE SENSOR

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/399,554

(22) PCT Filed: Sep. 28, 2001

(86) PCT No.: PCT/EP01/11234
§ 371 (c)(1),
(2), (4) Date: Aug. 19, 2003

(87) PCT Pub. No.: WO02/35186
PCT Pub. Date: May 2, 2002

(65) Prior Publication Data
US 2004/0027132 A1 Feb. 12, 2004

(30) Foreign Application Priority Data
Oct. 24, 2000 (EP) ............................................. 00123048

(51) Int. Cl.⁷ .............................. G06F 7/00; G06F 7/02; G06F 1/58
(52) U.S. Cl. ...................................... 702/45; 73/861.12
(58) Field of Search ............................ 702/33, 45, 49; 73/861.12, 861.17; 324/71.4, 439, 362; 361/152, 154

(56) References Cited

U.S. PATENT DOCUMENTS

| 4,420,240 | A | * | 12/1983 | Katsuma et al. ............. 396/535 |
| 4,462,060 | A | * | 7/1984 | Schmoock ................... 361/154 |
| 4,856,345 | A | * | 8/1989 | Mochizuki ................ 73/861.17 |
| 5,090,250 | A | * | 2/1992 | Wada ........................ 73/861.12 |
| 5,443,552 | A | * | 8/1995 | Tomita ...................... 73/861.17 |
| 5,905,206 | A | * | 5/1999 | Herwig et al. ............ 73/861.12 |

FOREIGN PATENT DOCUMENTS

| GB | 2 348 011 | 9/2000 |
| GB | 2 348 964 | 10/2000 |

* cited by examiner

*Primary Examiner*—Bryan Bui
*Assistant Examiner*—John Le
(74) *Attorney, Agent, or Firm*—Bacon & Thomas

(57) ABSTRACT

The invention relates to a method and to a device for system and process supervision in a magneto-inductive sensor. A medium flows through a measuring tube substantially in the direction of the axis of the measuring tube. A magnetic field extends through the measuring tube in a direction substantially perpendicular to the axis of the measuring tube. A measuring voltage is induced in at least one measuring electrode that is disposed substantially perpendicular to the axis of the measuring tube. The measuring voltage or the measurement data provide information on the volume flow of the measuring medium in the measuring tube. In addition to the determination of the volume flow, the detection of the modification of a system and/or process parameter is also desired. For this purpose, the measurement data are acquired digitized and stored as actual measurement data over a predetermined period and the actual measurement data are compared with predetermined desired measurement data. If there is a deviation between the actual measurement data and the desired measurement data, a message is output.

9 Claims, 2 Drawing Sheets

DEVICE AND METHOD FOR SYSTEM AND PROCESS SUPERVISION IN A MAGNETO-INDUCTIVE SENSOR

This application claims priority from PCT/EP01/11234 filed on Sep. 28, 2001.

FIELD OF THE INVENTION

This invention relates to a method and an apparatus for system and process monitoring with an electromagnetic sensor.

BACKGROUND OF THE INVENTION

The method and apparatus is based on a medium flowing through a flow tube essentially in the direction of the flow-tube axis, wherein a magnetic field passes through the flow tube in a direction essentially perpendicular to the flow-tube axis, wherein a measurement voltage is induced in at least one measuring electrode disposed essentially perpendicular to the flow-tube axis, and wherein the induced measurement voltage or the measurement data provide information about the volume flow of the medium in the flow tube.

European Patent, No. EP 0 814 324 B1 discloses an instrumentation amplifier arrangement for an electromagnetic flowmeter. To permit reliable conditioning of the measuring-electrode signals even in the presence of solids-loaded fluids, particularly of fluids having a high solids content, without increasing the coil current, the following inventive development is proposed in that patent specification: Each measuring electrode has an instrumentation amplifier arrangement associated with it. This arrangement comprises a preamplifier having its input end connected to the measuring electrode, and an A/D converter directly following the preamplifier. Also provided is a clock generator which feeds the A/D converter with a sampling signal, the clock frequency of the clock generator being greater than approximately 1 kHz. The A/D converters are followed by a subtracter. As stated above, in the prior art, the measuring-electrode signals are used exclusively to exactly determine the volume flow in the flow tube.

SUMMARY OF THE INVENTION

It is an object of the present invention to provide a method and apparatus which, in addition to determining the volume flow, allow the detection of a change in a system variable and/or process variable.

The method according to the present invention is characterized in that the actual measurement data is determined over a predetermined period of time and, if necessary, stored, that the actual measurement data is compared with predetermined, desired data, and that a message is output when a deviation is detected between the actual measurement data and the desired data. The message may be output in audible and/or visual form.

In short, according to the present invention, the voltage values at the measuring electrodes are observed continuously or intermittently. This permits a reliable statement to be made about a change in a system variable and/or process variable at an early time. As soon as a change in a system and/or process variable has been detected, a resulting error in the determination of the volume of the medium flowing through the flow tube can be effectively eliminated. It also becomes possible to detect any fault in a system or process component and to replace the faulty component as quickly as possible.

In a further development of the method according to the present invention, a message is only output to operating personnel if the actual measurement data lie outside preset tolerances about the desired data.

In a preferred embodiment of the method according to the present invention, the frequency spectrum U(f) of the voltage values induced in the measuring electrode is used for system and/or process monitoring. Thus, generally speaking, a change in the frequency spectrum characteristic of a system and/or a process is taken as an indication that an undesired change has occurred in a system variable and/or process variable.

Alternatively, at least one predetermined salient pattern within the frequency spectrum, e.g., a peak occurring at a given instant or at a given frequency, is used for the system and/or process monitoring. The peak may originate from a gear pump, for example. When the location or amplitude of this peak changes, this is a clear indication of a change in system and/or process conditions. If, in addition, the desired data is determined under different conditions, it is possible to infer from the change which of the system and/or process variables has changed.

The apparatus according to the present invention is characterized in that an evaluation/control unit determines actual measurement data over a predetermined period of time and stores this data, that the evaluation/control unit compares the actual measurement data with predetermined, desired data, and that the evaluation/control unit causes a message to be output when a deviation is detected between the actual measurement data and the desired data.

The present invention will now be explained in more detail with reference to the accompanying drawings, in which:

DESCRIPTION OF THE PREFERRED EMBODIMENT

Figure 1:
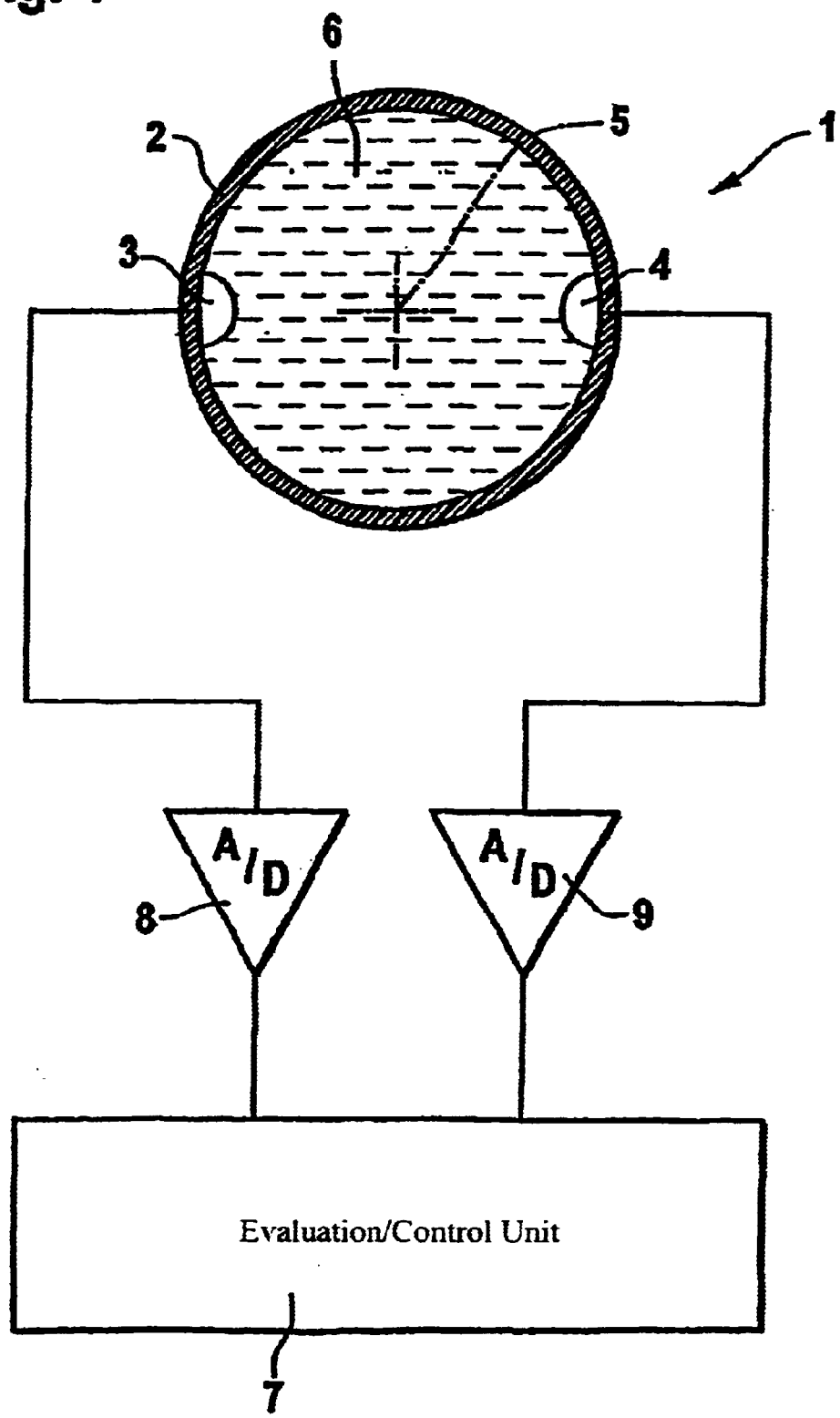
FIG. 1 is a schematic representation of the apparatus according to the invention.

FIG. 1 shows a schematic of an embodiment of the apparatus 1 according to the present invention. The medium 6 to be measured flows through the flow tube 2 of the sensor in the direction of the flow-tube axis 5. The medium 6 is at least slightly electrically conductive. The flow tube 2 itself is made of a nonconductive material, or at least its inside is covered with a nonconductive material.

Due to presence of a magnetic field which is produced by two diametrically opposed electromagnets (not shown in FIG. 1) and directed perpendicular to the direction of flow of the medium 6 to be measured, charge carriers in the medium 6 migrate to the oppositely poled measuring electrode 3, 4. The voltage U appearing between the two measuring electrodes 3, 4 is proportional to the flow velocity of the medium 6 averaged over the cross section of the flow tube 2, i.e., it is a measure of the volume flow of the medium 6 in the flow tube 2. The flow tube 2 is connected via connecting elements (not shown) to a tube system through which the medium 6 flows.

In the case shown, the two measuring electrodes 3, 4 are in direct contact with the medium 6, but the coupling may also be capacitive. The voltage values U, which are preferably determined at the measuring electrodes 3, 4 continuously, are digitized in the A/D converters 8, 9. The digital values are fed to the evaluation/control unit 7 for evaluation. Preferably, the evaluation/control unit calculates the frequency spectrum from the voltage values. It either determines changes originating from system and/or process variables based on a long-time examination of the frequency spectrum or picks out salient peaks in the frequency spectrum and outputs an error message as soon as changes in location and/or amplitude exceed preset tolerance values.

Figure 2:
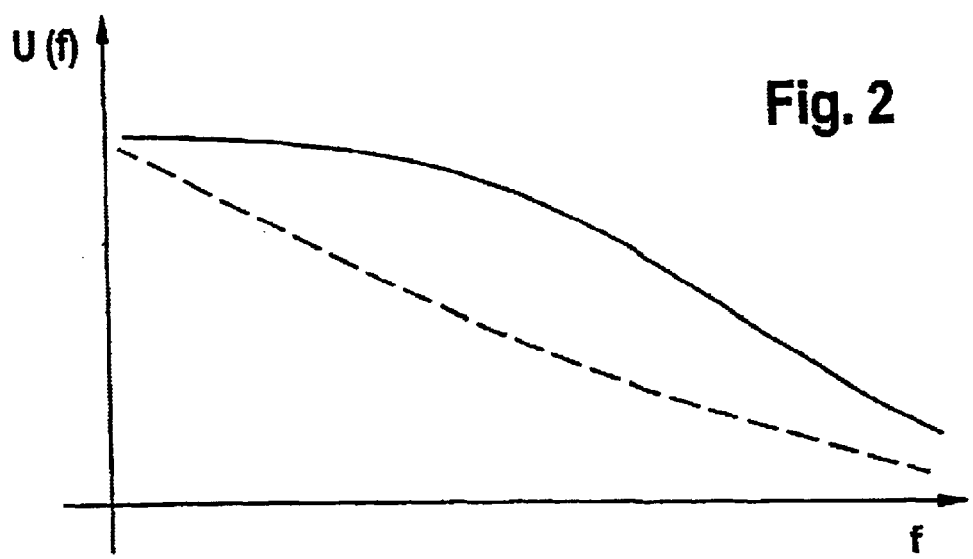
FIG. 2 shows a first frequency spectrum U(f)

FIG. 2 shows a first frequency spectrum U(f). The solid line characterizes the desired condition, which was determined at the beginning of the measurements or evaluations. The broken line characterizes the actual condition; it represents the frequency spectrum after a change in a system variable and/or process variable. As a result of the major deviations between the actual measurement data and the desired data, a message is output which informs the operating personnel that a fault has occurred.

Figure 3:
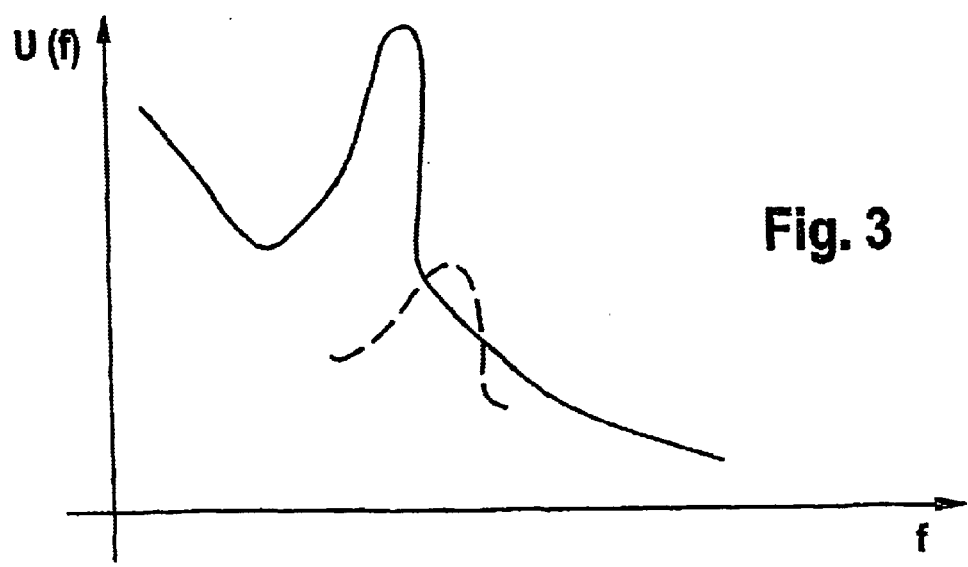
FIG. 3 shows a second frequency spectrum U(f).

The second frequency spectrum, shown in FIG. 3, differs from the first frequency spectrum of FIG. 2 by the occurrence of a salient peak of defined amplitude and defined location. The solid line again characterizes the desired condition, and the broken line represents the actual condition. If the location and/or amplitude of the peak changes during the ongoing process so that corresponding preset tolerance values are exceeded, an error message will be output. While in the former case, a change in the characteristic of the entire frequency spectrum is used for system and/or process monitoring, according to the second variant, at least one salient portion of the frequency spectrum is picked out and monitored for changes.

List of Reference Characters

1 Apparatus according to the invention
2 Flow tube
3 Measuring electrode
4 Measuring electrode
5 Flow-tube axis
6 Medium to be measured
7 Evaluation/control unit
8 A/D converter
9 A/D converter

What is claimed is:

1. A method for system and process monitoring with an electromagnetic sensor wherein a medium flows through a flow tube essentially in the direction of the flow-tube axis, wherein a magnetic field passes through the flow tube in a direction essentially perpendicular to the flow-tube axis, wherein a measurement voltage is induced in at least one measuring electrode disposed essentially perpendicular to the flow-tube axis, and wherein the induced measurement voltage or the measurement data provide information about the volume flow of the medium in the flow tube, the method comprising the steps of:

determining over a predetermined period of time the measurement data, digitizing and storing same as actual measurement data;

comparing the actual measurement data with predetermined, desired data; and outputting a message when a deviation is detected between the actual measurement data and the desired data wherein:

the frequency spectrum (U(f)) of the voltage values induced in the measuring electrode is used for the system and/or process monitoring.

2. A method as claimed in claim 1, wherein:
a predetermined salient pattern of the voltage values induced in the measuring electrode, which can be one of: a peak occurring at a given instant and a peak occurring at a given frequency, is used for the system and process monitoring.

3. A method as claimed in claim 1, wherein:
the message is only output if the actual measurement data lie outside preset tolerances about the desired data.

4. A method as claimed in claim 3, wherein:
a predetermined salient pattern of the voltage values induced in the measuring electrode, which can be one of: a peak occurring at a given instant and a peak occurring at a given frequency, is used for the system and process monitoring.

5. A method as claimed in claim 3, wherein: a predetermined salient pattern of the voltage values induced in the measuring electrode, which can be one of:
a peak occurring at a given instant, and a peak occurring at a given frequency, is used for the system.

6. A method as claimed in claim 3, wherein:
a predetermined salient pattern of the voltage values induced in the measuring electrode, which can be one of:
a peak occurring at a given instant, and a peak occurring at a given frequency, is used for process monitoring.

7. A method as claimed in claim 1, wherein:
a predetermined salient pattern of the voltage values induced in the measuring electrode, which can be one of:
a peak occurring at a given instant, and a peak occurring at a given frequency is used for the system.

8. A method as claimed in claim 1, wherein:
a predetermined salient pattern of the voltage values induced in the measuring electrode, which can be one of:
a peak occurring at a given instant, and a peak occurring at a given frequency, is used for process monitoring.

9. An apparatus for system and process monitoring with an electromagnetic sensor, comprising:

a flow tube defining an axis;

a magnet arrangement;

at least one measuring electrode; and an evaluation/control unit, wherein:

a medium to be measured flows through said flow tube in the direction of the flow-tube axis;

the magnet arrangement produces a magnetic field passing through said flow tube in a direction essentially perpendicular to the flow-tube axis; said at least one measuring electrode is disposed in a lateral area of said flow tube and is directly or capacitively coupled to the medium to be measured; and said evaluation/control unit provides information about the volume flow of the medium in the flow tube, said evaluation/control unit determines actual measurement data over a predetermined period of time, digitizes and stores said data as actual measurement data, said evaluation/control unit compares the actual measurement data with predetermined, desired data, and causes a message to be output when a deviation is detected between the actual measurement data and the desired data wherein:

the frequency spectrum (U(f)) of the voltage values induced in the measuring electrode is used for the system and/or process monitoring.

* * * * *